March 5, 1957      E. P. RIPLEY      2,783,522
METHOD FOR FABRICATING CONCRETE SLABS
Filed Sept. 16, 1952      3 Sheets-Sheet 1

INVENTOR.
EDWARD P. RIPLEY
BY Sellers and Latta
ATTORNEYS

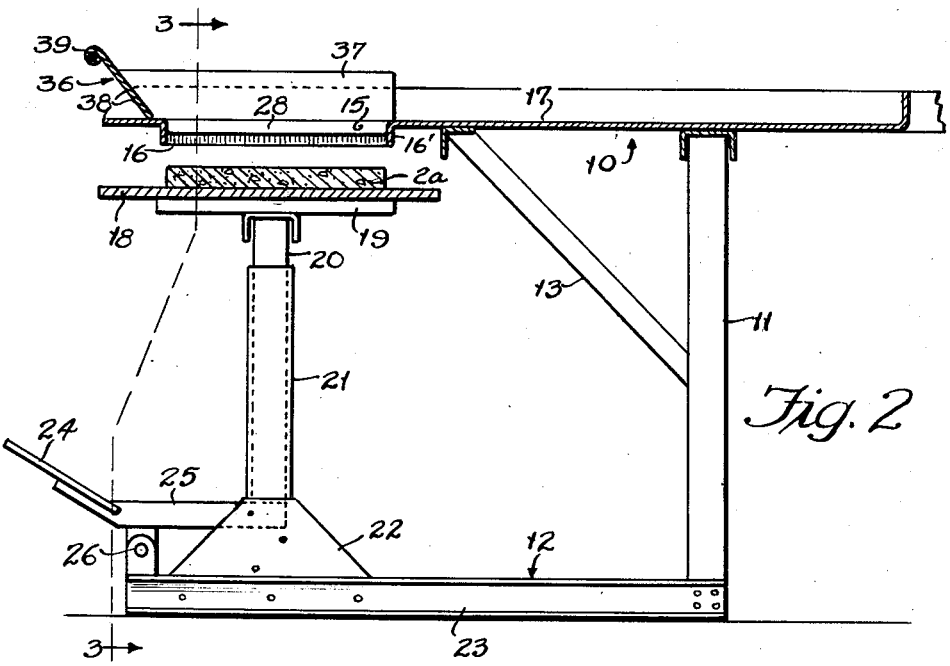
Fig. 2
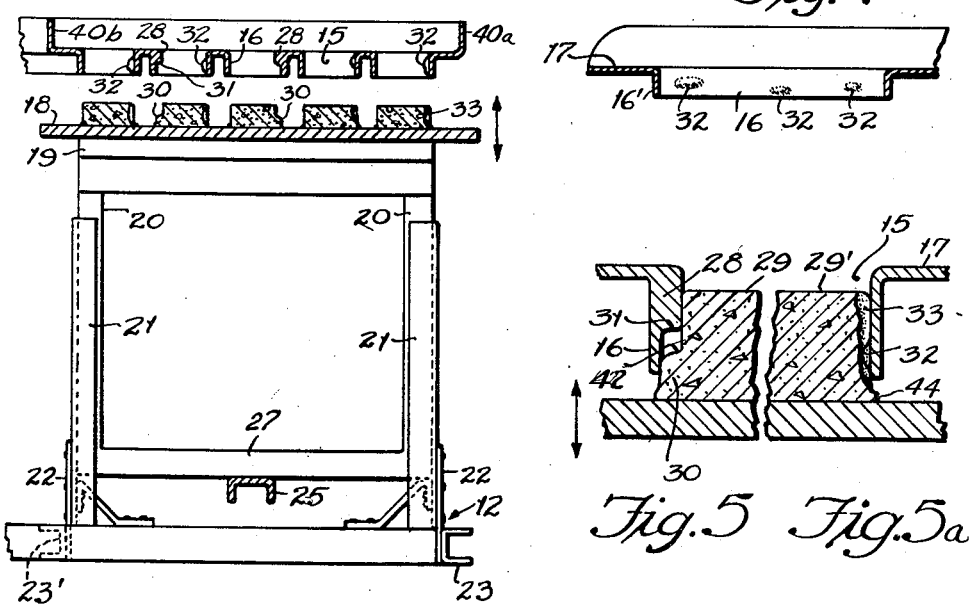
Fig. 3
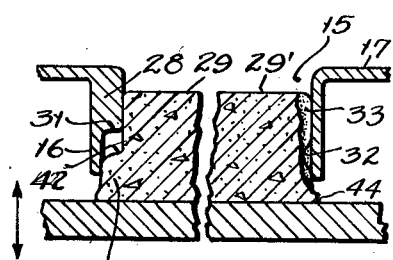
Fig. 4
Fig. 5   Fig. 5a
INVENTOR.
EDWARD P. RIPLEY
BY
Sellers and Latta
—ATTORNEYS—

March 5, 1957 E. P. RIPLEY 2,783,522
METHOD FOR FABRICATING CONCRETE SLABS
Filed Sept. 16, 1952 3 Sheets-Sheet 3
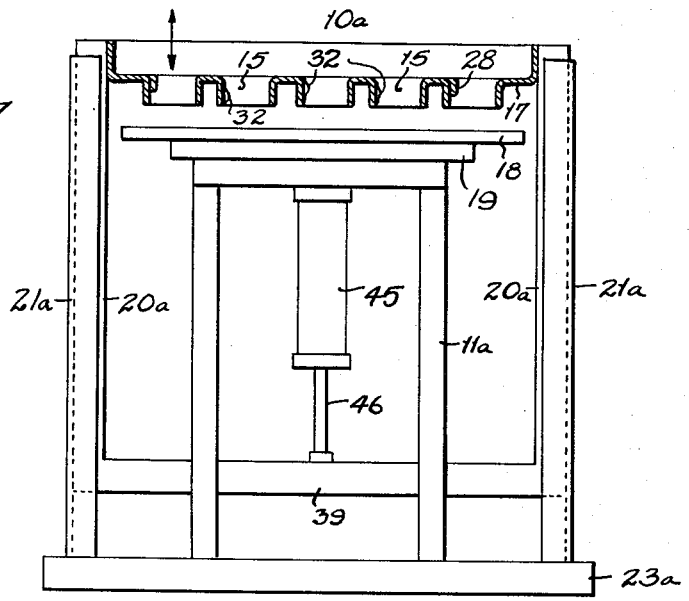
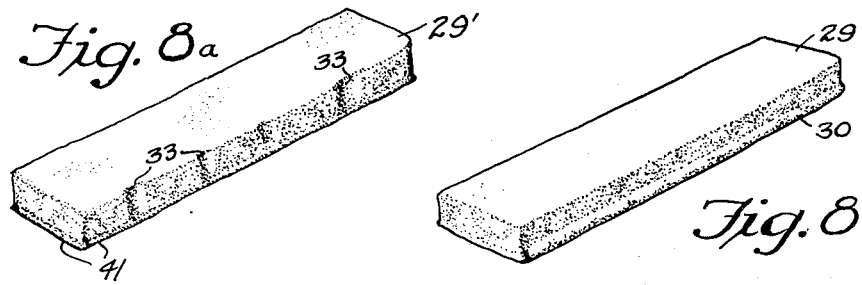
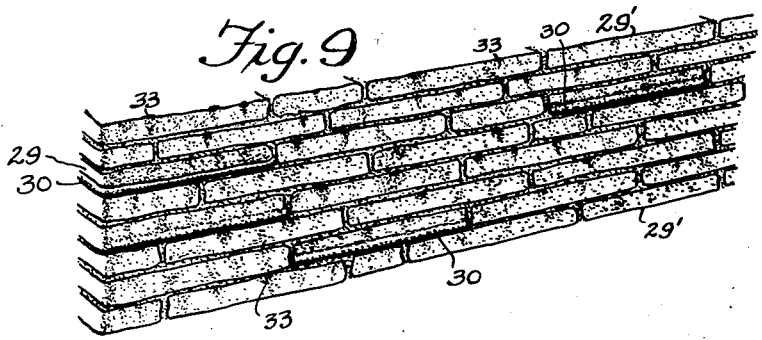
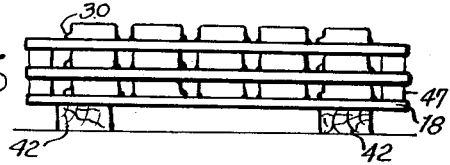
INVENTOR.
EDWARD P. RIPLEY
BY
Sellers and Latta
-ATTORNEYS-

United States Patent Office 2,783,522
Patented Mar. 5, 1957

2,783,522

METHOD FOR FABRICATING CONCRETE SLABS

Edward P. Ripley, Van Nuys, Calif.

Application September 16, 1952, Serial No. 309,758

4 Claims. (Cl. 25—155)

This invention relates to the fabrication of concrete blocks, its general object being to provide an improved process for fabricating a relatively thin, slab like block having an edge somewhat similar to that of flagstone. Such blocks are much in demand for the construction of decorative building fronts, where the cost of flagstone would be prohibitive.

One of the objects of the invention is to provide a process for fabricating such building blocks, having various irregular edge surfaces so as to avoid any regularity of occurrence of identical features of appearance in a wall fabricated from the blocks.

A specific object of the invention is to provide a process for fabricating slab like concrete blocks at least some of which have flanged edges providing an accentuated effect of irregularity in the finished wall composed of said edges. Another object is to provide a process for fabricating slab like concrete blocks having irregular vertical grooves and gouged areas in the side faces thereof, whereby to heighten the appearance of irregularity in the finished wall.

A further object is to provide an improved process whereby such blocks may be molded, cured and stored in quantity, rapidly, easily and economically.

Other objects will become apparent in the ensuing specifications and appended drawings in which:

Fig. 2 is a side view thereof, partially in section as indicated by the line 2—2 of Fig. 1;

Fig. 3 is a fragmentary front elevational view of the apparatus, showing one of the molding arms in section, as indicated by line 3—3 of Fig. 1;

Fig. 4 is a detail longitudinal sectional view of one of the mold apertures;

Figs. 5 and 5a are detail fragmentary transverse sectional views of different mold apertures, illustrating molding operations therein;

Fig. 6 is a side view of one of the curing stacks;

Fig. 7 is a skeleton elevation of a modified form of the apparatus which may be utilized, instead of that shown in Figs. 1-3, for executing the process;

Figs. 8 and 8a are perspective views of blocks of varying appearance, produced by the process; and Fig. 9 is a perspective view of a wall constructed from blocks processed by the invention.

The apparatus

Figure 1:
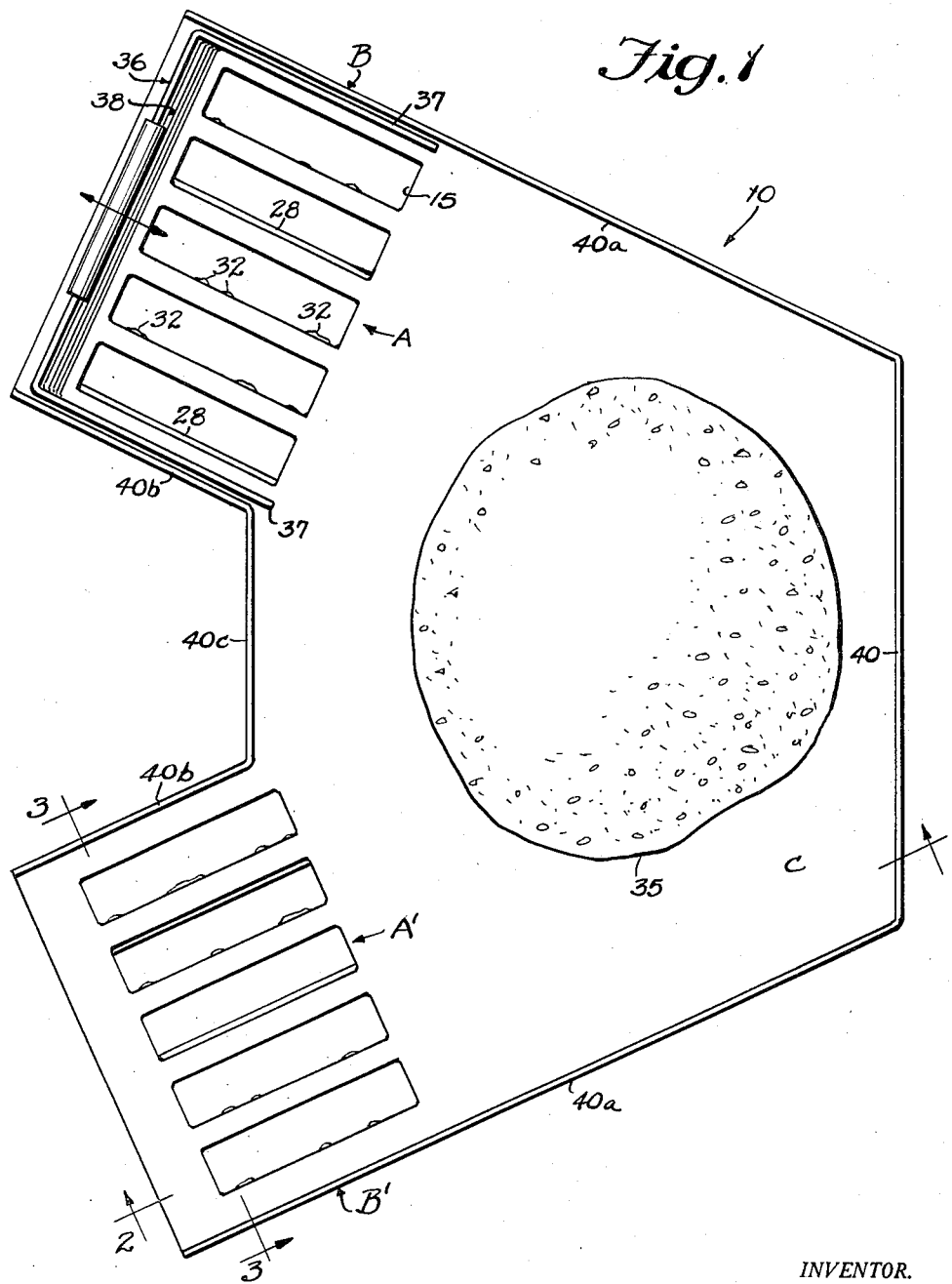
Fig. 1 is a plan view of an apparatus embodying the invention.

As an example of one form of apparatus which may embody the invention I have shown in the drawings a manually operable block molding apparatus embodying a work table which is indicated generally by the reference numeral 10, said table being suitably supported, as by legs 11 carried by a base 12, and braced in a horizontal position by any suitable means such as braces 13.

Table 10 has one or more groups of mold apertures indicated generally at A and A' respectively, each group comprising a plurality of apertures 15 defined by side flanges 16 and end flanges 16' projecting downwardly from the horizontal bed plate 17 of table 10. Thus the upper extremities of openings 15 lie in the plane of the upper surface of bed plate 17 while the lower extremities project below the same.

The open lower extremities of the openings 15 are closed, under the control of the operator, by pallets 18, one of which is disposed beneath each of the groups A, A' of apertures, preparatory to molding a series of blocks. Means, which will be presently described, are provided for elevating the pallets 18 into contact with the lower edges of flanges 16, 16' so as to close the bottoms of the openings 15, thereby to provide a series of mold cavities in which the blocks are molded.

The above referred to elevating means, for each of the groups A, A' of cavities, comprises a seat 19 carried upon and secured to the upper ends of a pair of slides 20 which are mounted for vertical sliding movement in slideways comprising opposed channel members 21 secured at their lower ends, as by means of gusset plates 22, to spaced frame members 23, 23' of the base 12.

For raising the seat 19, we provide a treadle 24, attached to one end of a lever 25 which is pivoted at 26 to the base 23, the other end of lever 25 bearing upwardly against a cross member 27 joining the lower ends of slides 20. When the operator presses down on treadle 24, it raises the seat 19 to elevate pallet 18 against the lower edges of flanges 16, 16'.

For shaping the blocks with irregular side faces, we provide, on the inner faces of flanges 16, 16' different types of protuberances, as follows:

(a) Cornices 28, projecting inwardly from the upper regions of one or more of the side flanges 16 and 16', and overhanging the lower portions thereof, as shown in Fig. 5. Cornices 28 extend substantially the full length of those side flanges 16 to which they are attached, as shown in Fig. 2. A cornice 28 serves to narrow the width of the upper portion of a block 29 shaped thereby, so as to leave a wale 30 extending longitudinally along the lower corner thereof as shown in Fig. 5. The wale 30 is shaped by the thin lower portion of mold flange 16 and the shoulder 31 which is defined by the lower side of cornice 28. Cornices 28 may comprise strips or bars welded to the upper areas of selected inner walls of flanges 16, 16'; or may comprise longitudinal ridges or wales of weld metal, deposited on such inner walls by a welding technique.

(b) Protuberances 32 of weld metal, of irregular shapes and sizes, attached to other inner walls of flanges 16 (and in some cases flanges 16') at various heights on such inner walls. Protuberances 32 function to describe vertical cavities or grooves 33 in the block faces shaped thereby, as indicated in Fig. 5a. The effect is an irregular one between successive operations, depending upon the degree of adherence of a particular mold charge to the mold walls.

Table 10 comprises one or more molding area arms B, in which the groups A and A' of mold apertures 15 are arranged, and a hod area C adapted to receive and support a pile of concrete mix 35. In the particular arrangement shown, which has a plurality of the arms B, B', these arms are arranged in a generally radial relation to a center located within or in the vicinity of the hod area C, in order that successive charges of concrete may be withdrawn directly from hod area C into the respective arms B, B'.

The apparatus includes one or more strike-off tools 36, each of which (Fig. 2) includes a pair of vertical side arms 37 joined by a blade 38 which has a lower striking edge disposed substantially in a common plane with the lower edges of side arms 37 and is disposed in a plane which is inclined with reference to this common plane of the lower edges, substantially as shown in Fig. 2. Striking tool 36 also includes a handle 39 formed at the upper side of blade 38.

The table 10 includes a rim which may extend around the margin of the table so as to cooperate with bed 17 to give the table the general form of a tray. This rim may include a back portion 40, side portions 40a, portions 40b along the inner sides of arms B, B', and a portion 40c joining the portions 40b.

In using the strike-off tool 36, the side arms 37 thereof are guided between rim members 40a and 40b of a respective table arm B, the rim members functioning as ways, and the lower edges of arms 37 and blade 38 riding upon the upper surface of horizontal table top 17. The tool is worked back and forth in the direction indicated by the double arrow in Fig. 1, wedging the mix downwardly into the mold apertures 15 as it is moved toward the end of the arm B, and striking off excess concrete and moving it back toward the hod area C when it is moved toward the center of the table.

It is to be understood that other specific forms of the apparatus may be employed, and that the number of molding areas A, A' etc., may range from one up to as many a half dozen, arranged around a common center depending upon the requirement of a particular manufacturing operation. Also, it is to be understood that it is possible to utilize a fixed pallet seat in connection with a vertically movable mold aperture table, and to effect relative vertical movement between the pallet and the aperture table by moving the latter vertically, as indicated by the double arrow in Fig. 7.

Figs. 8 and 8a illustrate, respectively, the two main types of surface produced in the use of our process. Fig. 8 illustrates the characteristic appearance of the block with a fairly deep wale 30 along one edge thereof. Fig. 8a illustrates a characteristic grooved block with vertical grooves 33 therein, and with a slightly flared corner 41.

Fig. 9 illustrates the decorative appearance of a wall facing composed of blocks produced by the invention.

The process

My improved process embodies the following steps of operation:

1. A concrete mix, moderately "wet" in consistency, and highly homogeneous, including a more widely varying degree of "fines" (sand, pumice etc.) than is customarily employed in the manufacture of concrete blocks, is prepared. The mix may contain, for example, by volume, a percentage of fines within the range from 30 percent to 100 percent and a percentage of coarse aggregates within the range from zero to 70 percent. The wide range of fines provides for varying textures in the finished surfaces of the blocks. A higher percentage of water than that customarily employed in the manufacture of concrete blocks, is added to the dry ingredients so as to produce the moderately wet mix. Also, a plasticizer is added to the mix to increase plasticity and coherence.

A quantity of the mix, indicated at 35 in Fig. 1, is deposited upon the hod area C of the table 10, from which successive portions may be withdrawn by a suitable tool (such as a hoe) and moved into the arms B of the table 10, to charge the mold cavities. In the operation of the particular apparatus shown, two workmen may work from the same pile of concrete mix 35, each operating one of the mold cavity groups A, A'.

2. In charging a group of mold cavities, the operator first moves the pallet 19 upwardly into engagement with the lower edges of the mold aperture flanges 16, 16' to close the bottoms of the mold apertures. The concrete mix is raked into the cavities and is then struck off and levelled by drawing the striking tool 36 back and forth within the respective arm B of the table, as indicated by the double arrow in Fig. 1.

3. After charging a group of mold cavities, the operator lowers the pallet 18 until the blocks 29, 29', etc., are almost, but not quite withdrawn from the mold apertures 15. The pallet is then raised until it is brought back into contact with the lower edges of flanges 16, 16' and is then again lowered. During this raising operation, the contact of the mold walls 16, 16' against the side faces of the upwardly moving blocks, tends to work the material of the sides of the blocks downwardly and to cause it to spread somewhat, just above the pallet 18. In the return upward movement of the pallet, the spreading lower corner portions of the blocks are mashed downwardly to produce relatively thin fins 44 along the lower corners of the blocks, as shown in Fig. 5a. Also, the return movement accentuates the definition of the shoulder portions 42 of the wales 30 which are shaped below the shoulders 31 of the cornices 28 of the mold. A third result of this raising and lowering operation is to accentuate the definition of the vertical grooves 33 produced by protuberances 32. A fourth result of the raising and lowering operation is to roughen the relatively flat side faces of the blocks in the areas where they are shaped by smooth walls of the mold, as the result of the adherence of the wet mix to these smooth walls, thereby adding to the informal and irregular surface texture produced in the process. This return upward movement of the pallet is essential to the result aimed at by the invention.

4. After the shaping operation is completed, the pallet 18 is lowered to the position shown in Fig. 3 and is then lifted off the supporting seat 19, and placed in a stack for curing. The curing stack is started with a pair of spaced supporting blocks 43, supported upon the ground, with the pallet 18 resting thereon, and with a tier of blocks 29, 29' etc., supported upon this pallet. Successive tiers of blocks, each supported by a respective pallet 18, are built upon the lowermost pallet 18 as indicated in Fig. 6.

5. The stack is initially built up in the vicinity of the molding machine. After it has reached a predetermined height, it is picked up by a fork lift on a transport truck and is carried to a curing yard where it is again set down on a pair of spaced supporting blocks and left there until the blocks are cured.

6. After the blocks have been thus cured in the stack, the stack is torn down, the blocks being transferred to a storage yard where they are stacked in a conventional manner to await delivery to customers.

Modified form

It is to be understood that the invention need not necessarily be carried out on a manually operable machine. On the contrary the process of the invention can be performed largely on an automatic machine. Fig. 7 illustrates a power operated machine which has a stationary pallet supporting head 19 carried by legs 11a fixed to a base 23a. A movable molding table 10a is carried by the upper end of slides 20a the lower ends of which may be joined by a cross beam 39. Power raising and lowering of the molding table 10a may be provided for by a hydraulic servomotor including a cylinder 45 secured to head 19 and having a piston (not shown) attached to a piston rod 46 the lower end of which is attached to cross beam 47. Thus the upward movement of the piston rod 46 will move the table 10a upwardly, whereas downward movement of the piston rod will move the mold frame downwardly against pallet 18 as supported upon head 19.

Summary

An especially important feature of the invention is the use of a wet mix in a mold having side walls with protuberances for effecting a departure from regular, flat, squared side wall contour in the molded blocks, the mix being of such a wetness as to effect the following results;

(a) the mix will tend to flow slightly below the edges of the mold frame flanges 16, 16' when the mold is partially opened (partial lowering of the pallet in the form shown in Fig. 2, or raising of the mold frame in the form shown in Fig. 7);

(b) the mix will adhere to the side walls of the mold frame sufficiently so that each succeeding block coming out of any particular mold cavity, will have a surface texture departing somewhat from that of the preceding blocks coming from the same cavity, the texture always being irregularly rough due to an irregular tearing-away action between the sides of the block and the side walls of the mold as the block is removed from the mold cavity, this action being accentuated by the protuberances;

(c) the wetness is such that the mix will fill the mold cavity, filling in the interstices between protuberances, without requiring any vibrating or other compacting operation.

I claim:

1. Steps in a method of fabricating concrete blocks capable of generally simulating flagstone slabs, wherein there is utilized an open-bottom cavity mold frame having mold cavity having a mouth at its upper extremity and having side walls for shaping the side faces of the blocks, with at least one of said side walls having protuberances projecting inwardly from a flat vertical face thereof, said steps comprising: preparing a mix of moderately wet consistency and highly homogeneous, such as to fill and assume the shape of the mold cavity without the assistance of vibration; applying a pallet, in a horizontal position, to the bottom of said mold frame to close the same so as to define a mold cavity; depositing a quantity of the mix on a supporting surface adjacent the cavity mouth; moving the cement mix solely by non-vibratory gravity flow from said supporting surface into the cavity so as to preliminarily shape therein a green block in which a departure from flat, squared lateral wall contour is caused by said protuberances; partially opening the mold by effecting relative vertical movement between the pallet and the mold frame while maintaining the block in engagement with the pallet solely by the action of gravity on the block, whereby to effect relative vertical movement between the side walls of the mold cavity and the block, and then reclosing the mold so as to accentuate said departure; then fully opening the mold and again effecting relative vertical movement between the mold frame and the pallet sufficiently to completely separate the block from the mold frame while maintaining the block in engagement with the pallet solely by the action of gravity, leaving the block resting upon said pallet; and then bodily removing the pallet from the vicinity of the mold frame, depositing it on a support, and leaving it resting thereon with the green block remaining supported by the pallet, for curing.

2. Steps in a method of fabricating concrete blocks capable of generally simulating flagstone slabs, wherein there is utilized an open-bottom mold frame having a mold cavity provided with an open mouth at its upper extremity, with a mix supporting table adjoining said mouth, and with side walls for shaping the side faces of the blocks, at least one of said side walls having a longitudinally extending cornice projecting inwardly from a flat vertical face thereof; maintaining said mold frame in a position wherein said cornice is disposed near the upper side of the mold frame; applying a pallet to the lower side of the mold to define therewith an open-top mold cavity with said pallet defining the bottom thereof and with a longitudinally extending recess defined below said cornice and above said bottom; preparing a cement mix of moderately wet consistency and highly homogeneous, such as to fill and assume the shape of the mold cavity without the assistance of vibration depositing a quantity of the mix on said table; moving said mix solely by non-vibratory gravity flow from said table into said cavity so as to preliminarily shape therein a green block in which a departure from flat, squared lateral wall contour is produced by said cornice; partially opening and then reclosing the mold by effecting relative vertical movement between the pallet and the mold frame while maintaining the block in engagement with the pallet through solely the action of gravity on said green block to cause a peripheral portion thereof to more completely enter and conform to the contours of said recess, to form a wale along the bottom of the block in such opening and reclosing step; then fully opening the mold by again effecting relative vertical movement between the pallet and the mold frame while maintaining the block in engagement with the pallet through solely the action of gravity on the block to completely separate the block from the mold frame, leaving the block resting upon said pallet; and then bodily removing the pallet from the vicinity of the mold frame, depositing it on a support, and leaving it resting thereon with the green block remaining supported by the pallet, for curing.

3. Steps in a method of fabricating concrete blocks capable of generally simulating flagstone slabs, wherein there is utilized an open-bottom mold frame having a mold cavity provided with an open mouth, with a mix supporting table adjoining said mouth, and with side walls for shaping the side faces of the blocks, at least one of said side walls having protuberances projecting inwardly from flat vertical faces thereof, said steps comprising: preparing a mix of moderately wet consistency and highly homogeneous, such as to fill and assume the shape of the mold cavity without the assistance of vibration; applying a pallet, in a horizontal position, to the bottom of said mold frame to close the same so as to define a mold cavity; depositing a quantity of the mix on said table moving the cement mix solely by non-vibratory gravity flow from said table into the cavity so as to preliminarily shape therein a green block in which a departure from flat, squared lateral wall contour is caused by said protuberances; partially opening the mold by lowering and then raising the pallet while maintaining the block in engagement with the pallet through solely the action of gravity on the block to effect relative vertical movement between the side walls of the mold cavity and the block, such as to cause said protuberances to score a side face of the block and then reclosing the mold so as to accentuate said scoring action; then fully opening the mold by lowering the pallet while utilizing solely the action of gravity on the block to maintain the block in engagement with the pallet, whereby to completely separate the block from the mold frame, leaving the block resting upon said pallet; and then bodily removing the pallet from the vicinity of the mold frame, depositing it on a support, and leaving it resting thereon with the green block remaining supported by the pallet for curing.

4. Steps in a method of fabricating concrete blocks capable of generally simulating flagstone slabs, wherein there is utilized an open-bottom mold frame having mold cavity side walls for shaping the side faces of the blocks, with at least one of said side walls having protuberances projecting inwardly from flat vertical faces thereof, said steps comprising; preparing a mix of moderately wet consistency and highly homogeneous, such as to fill and assume the shape of the mold cavity without the assistance of vibration; applying a pallet, in a horizontal position, to the bottom of said mold frame to close the same so as to define a mold cavity; moving the cement mix into the cavity without vibrating the mold frame so as to preliminarily shape therein a green block in which a departure from flat, squared lateral wall contour is caused by said protuberances; partially opening the mold by effecting relative vertical movement between the pallet and the frame while utilizing solely the action of gravity on the block to maintain the block in engagement with the pallet, whereby to effect relative vertical movement between the side walls of the mold cavity and the block such as to cause said protuberances to score a side face of the block, and then reclosing the mold so as to accentuate said scoring action; then fully opening the mold by effecting relative vertical movement between the pallet and the mold frame while utilizing solely the action of gravity on the block to maintain the block in engagement with the pallet, whereby to completely separate the block from the mold frame, leaving the block resting upon said pallet; and then bodily removing the pallet from the vicinity of the mold frame, depositing it on a support, and leaving it resting thereon with the green block remaining supported by the pallet for curing.

References Cited in the file of this patent

UNITED STATES PATENTS

| | | |
|---|---|---|
| 1,803,814 | Spengler et al. | May 5, 1931 |
| 2,298,446 | White | Oct. 13, 1942 |
| 2,532,049 | Wittke | Nov. 28, 1950 |
| 2,577,215 | Smith et al. | Dec. 4, 1951 |
| 2,586,184 | Sturtevant et al. | Feb. 19, 1952 |